(12) United States Patent
Feese et al.

(10) Patent No.: US 8,887,426 B2
(45) Date of Patent: Nov. 18, 2014

(54) ELASTOMERIC EXTRACTOR MEMBER

(71) Applicant: RA Brands, L.L.C., Madison, NC (US)

(72) Inventors: Devin Feese, Knifley, KY (US); Jeffrey W. Stone, Elizabethtown, KY (US)

(73) Assignee: Madison NC (US)

( * ) Notice: Subject to any disclaimer, the term of this patent is extended or adjusted under 35 U.S.C. 154(b) by 0 days.

(21) Appl. No.: 13/837,298

(22) Filed: Mar. 15, 2013

(65) Prior Publication Data

US 2014/0259842 A1 Sep. 18, 2014

(51) Int. Cl.
*F41A 15/10* (2006.01)
*F41A 15/14* (2006.01)
*F16F 1/36* (2006.01)

(52) U.S. Cl.
CPC ............... *F41A 15/14* (2013.01); *F41A 15/10* (2013.01); *F16F 1/36* (2013.01)
USPC ............................................................ 42/25

(58) Field of Classification Search
CPC ......... F41A 15/00; F41A 15/08; F41A 15/10; F41A 15/12; F41A 15/14; F41A 15/16; F41A 15/18
USPC ............................................................ 42/25
See application file for complete search history.

(56) References Cited

U.S. PATENT DOCUMENTS

| | | | |
|---|---|---|---|
| 2,712,192 A * | 7/1955 | Dixon et al. | ...................... 42/25 |
| 3,397,473 A | 8/1968 | Browning | |
| 4,265,043 A | 5/1981 | Rowlands | |
| 5,768,815 A | 6/1998 | Casull | |
| 5,979,331 A | 11/1999 | Casull | |
| 6,000,161 A | 12/1999 | Aalto | |
| 6,044,748 A | 4/2000 | Westrom | |
| 6,182,389 B1 | 2/2001 | Lewis | |
| 6,484,430 B1 | 11/2002 | Robinson et al. | |
| 6,536,150 B2 | 3/2003 | Schweikart | |
| 6,604,314 B2 | 8/2003 | Fluhr | |
| 6,609,319 B1 | 8/2003 | Olson | |
| 6,966,137 B2 | 11/2005 | Gussalli Beretta | |
| 7,395,626 B2 | 7/2008 | Zedrosser | |

(Continued)

FOREIGN PATENT DOCUMENTS

DE 19903327 8/2000
GB 617142 * 2/1949

OTHER PUBLICATIONS

"AR-15 Extractor Upgrade"; 1 page; Dillon Precision Products, Inc.; http://www.dillonprecision.com/content/p/9/pid/24687/catid/17/AR_15_Extractor_Upgrade.

(Continued)

*Primary Examiner* — Stephen M Johnson
(74) *Attorney, Agent, or Firm* — Womble Carlyle Sandridge & Rice, LLP

(57) ABSTRACT

A biasing member for a bolt assembly of a firearm is described herein. The biasing member comprises a body having a first portion configured to engage and seat within a biasing member receiving indentation of an arm of the extractor, and a second portion configured to engage and seat within a receiving area along a bolt of the firearm. The body provides a biasing force directed against the extractor arm. The body comprises an elastomeric material, and is configured such that the first and second portions provide varying levels of compression sufficient to maintain a substantially constant extractor tension between the extractor arm and a cartridge.

10 Claims, 8 Drawing Sheets

(56) References Cited

U.S. PATENT DOCUMENTS

| | | |
|---|---|---|
| 7,478,494 B2 | 1/2009 | Zeh |
| 7,627,974 B2 | 12/2009 | Olson |
| 7,735,410 B2 | 6/2010 | Clark |
| 8,069,600 B2 | 12/2011 | Rousseau et al. |
| 8,096,074 B2 | 1/2012 | Robinson et al. |
| 2005/0262752 A1 | 12/2005 | Robinson et al. |
| 2008/0092733 A1 | 4/2008 | Leitner-Wise et al. |
| 2008/0209788 A1 | 9/2008 | Olson |
| 2011/0005383 A1 | 1/2011 | Kramer |
| 2011/0168009 A1 | 7/2011 | Robb et al. |

OTHER PUBLICATIONS

"Extractor Spring Insert for AR15 / M16", http://www.windhamweaponry.com/shopexd.asp?id=140 (accessed Mar. 5, 2013).

"LMT O-Ring", http://www.mcssl.com/store/center-mass/catalog/product/37cbf23c122b4aeba55a6d322bd701ea (accessed Feb. 27, 2013).

"SLR 15 Rifle Specs—Extractor/Extraction System"; 3 pages; http://www.slrrifels.com.

"Ultimate Extractor Upgrade", http://sixsigmaarms.com/products.php?d=3 (accessed Mar. 7, 2013).

Jeff Chudwin; D-Fender? Whats that? Does it really enhance extraction?; 1 page endorsement by Chief of Police, Olympia Fields P.D.

MGI D-Fender Advertisements; 1 page; http://Google Images.com.

The MGI D-Fender D-Ring Brochure; 1 page; www.mgi-military.com; MG Industries; Bangor, Maine.

International Search Report dated Sep. 8, 2014 for PCT/US2014/024646 filed Mar. 12, 2014.

Written Opinion mailed Sep. 8, 2014 for PCT/US2014/024646 filed Mar. 12, 2014.

* cited by examiner

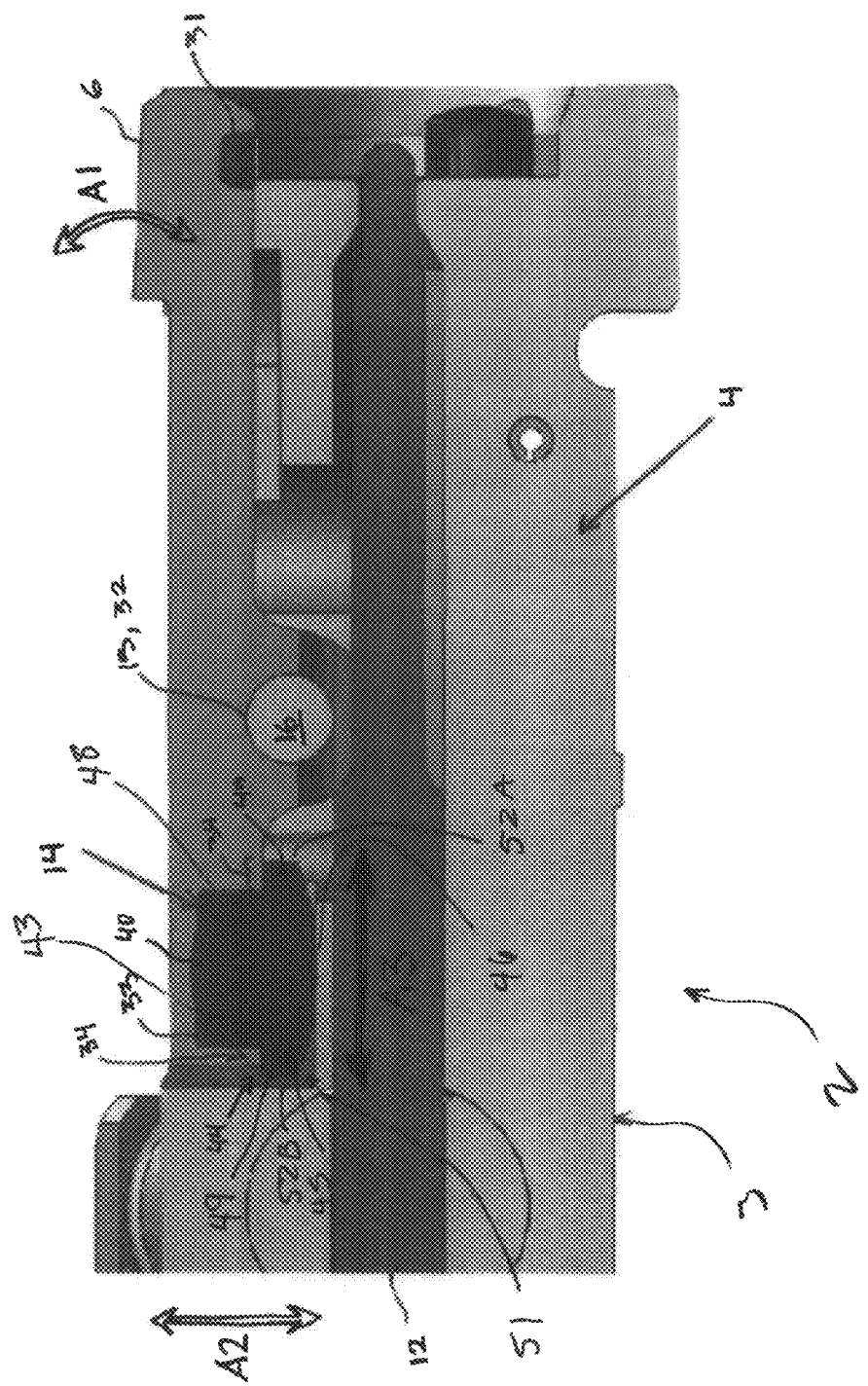

ELASTOMERIC EXTRACTOR MEMBER

FIELD OF THE INVENTION

The present invention generally relates to firearms and components thereof, and in particular, to an elastomeric biasing member for operation of an extractor of a firearm.

BACKGROUND OF THE DISCLOSURE

Many firearms, including bolt action, semiautomatic, and/or fully automatic firearms utilize a pivoting-type extractor system for extraction of cartridges from the firearm chamber. Typically, such conventional pivoting extractor systems will include an arm or elongated body generally engaged at one end by a spring that provides a biasing force to urge the extractor into engagement with a cartridge in the firearm chamber. These springs usually are made from metal and are subjected to repeated stresses, high heat, and vibration during use of the firearm which may result in premature failure. For example, the biasing force often provided through a coiled metallic spring can undergo a number of cycles where it is compressed, and then may relax, while at the same time being exposed to repeated heating and cooling cycles.

Accordingly, a need exists for an extractor mechanism that addresses these and other drawbacks.

SUMMARY OF THE DISCLOSURE

In one aspect, the disclosure is generally directed to a biasing member for a pivoting extractor of a firearm. The biasing member comprises a body having a first portion configured to engage and seat within a biasing member receiving indentation of a bolt assembly of the firearm and a second portion configured to provide a biasing force to the pivoting extractor. The body of the biasing member includes a geometry configured to provide controlled extractor tensions through a range of motion of the pivoting extractor. The body of the biasing member can further consist essentially of an elastomeric material.

In another aspect, the disclosure is generally directed to a bolt assembly for a firearm. The bolt assembly comprises a bolt, an extractor arm pivotally mounted in the bolt and having a biasing member receiving indentation formed thereon, and a biasing member in mechanical communication with the extractor arm. The biasing member has a body engaged within the biasing member receiving indentation, and is configured to provide a biasing force against the bolt and extractor arm. The body can also consist essentially of an elastomeric material.

In yet another aspect, the disclosure is generally directed to a firearm. The firearm can include a bolt assembly having a pivoting extractor and a biasing member in communication with the pivoting extractor. The biasing member comprises a body having a first cylindrical portion mounted in the extractor and a second cylindrical portion external to the pivoting extractor configured to provide a biasing force to the pivoting extractor. The body further can consist essentially of an elastomeric material.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

FIG. 7 is a cut-away view of an assembled carrier assembly illustrating positioning of the biasing member of FIG. 4.

Corresponding parts are designated by corresponding reference numbers throughout the drawings.

DETAILED DESCRIPTION OF THE EXEMPLARY EMBODIMENTS

Figure 1A:
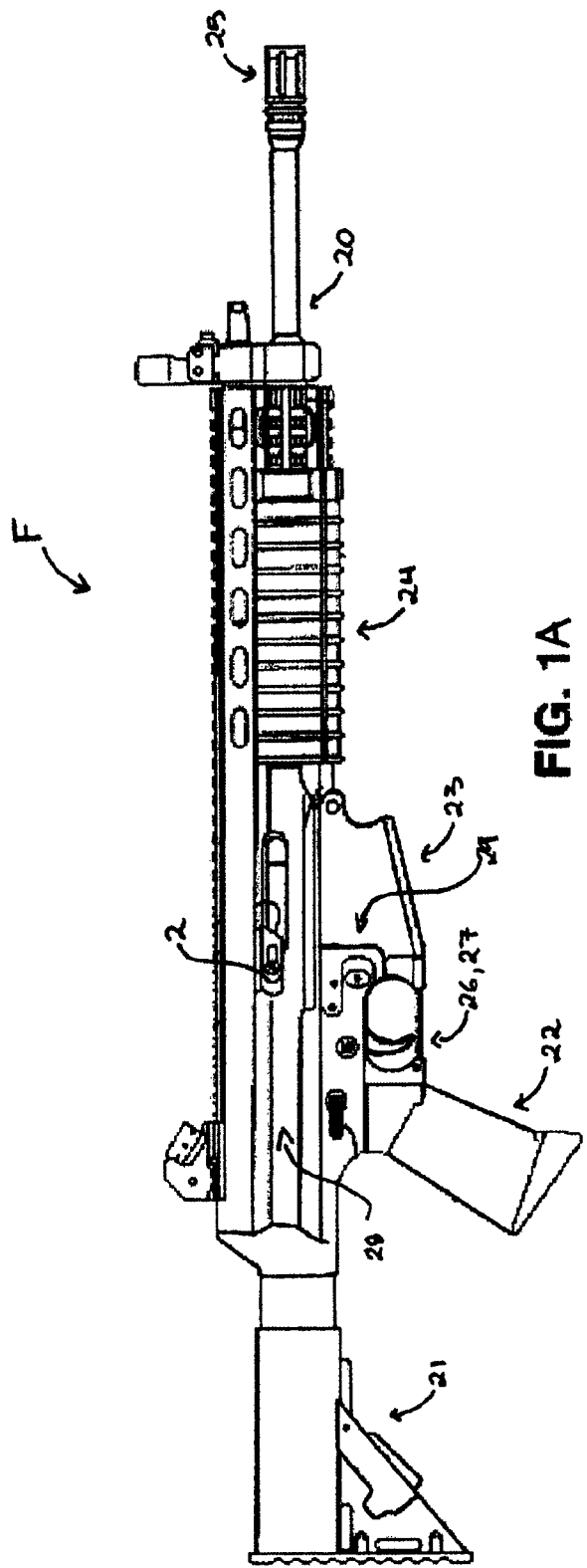
FIG. 1A illustrates a firearm.

Referring now to the drawings in which like numerals indicate like parts throughout the several views, the present invention generally is directed to components of firearms including biasing members suitable for direct replacement in a plurality of firearms. In particular, in one embodiment, the present invention includes a biasing member having a geometry and material selection which provides higher and/or constant extractor tension during operation of a firearm. It will be understood by those skilled in the art that the present invention can be adapted for use with various types of firearms, including various types of semi-automatic, automatic, and manually operable rifles, shotguns and/or other long guns, as well as various types of handguns.

Figure 1B:
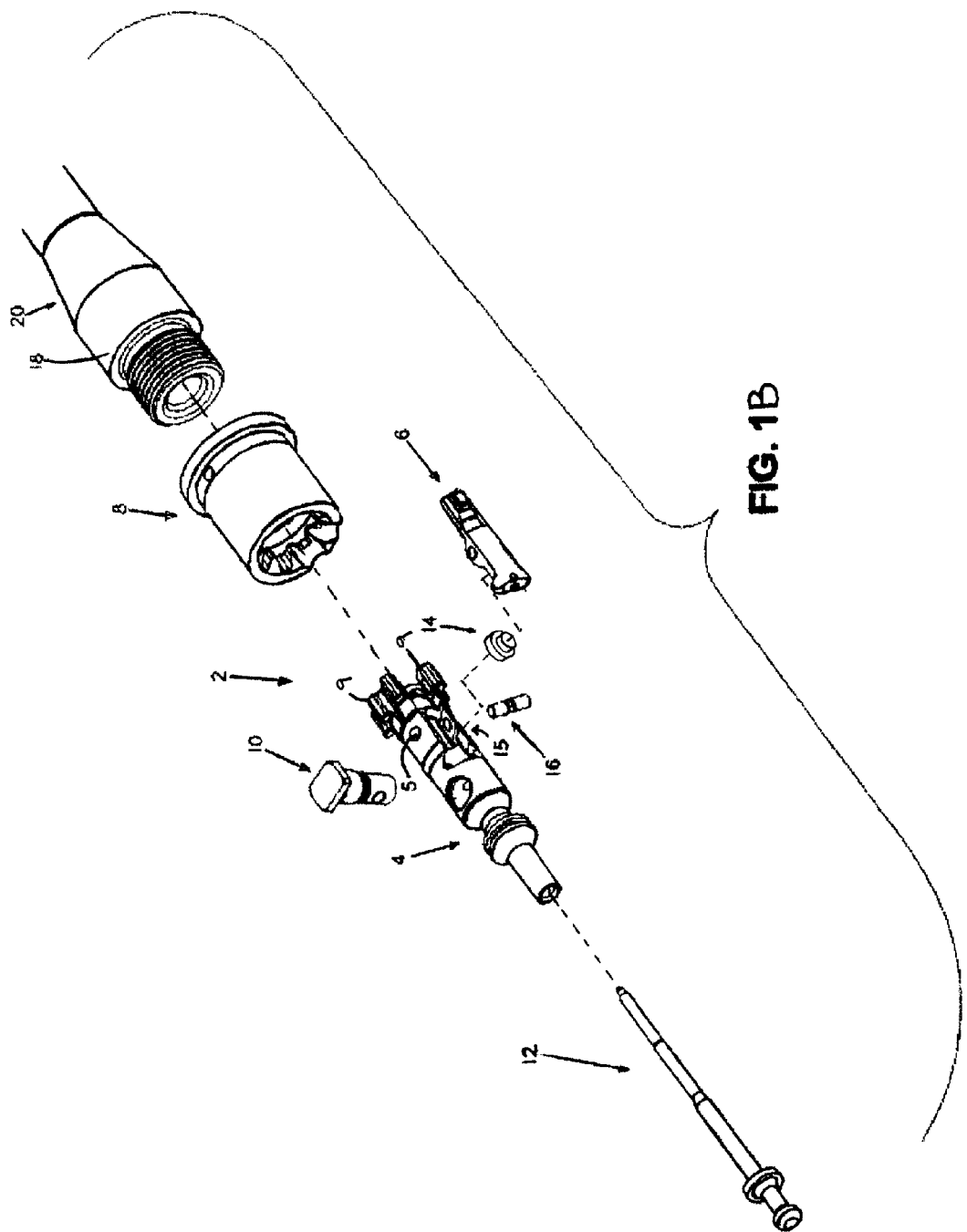
FIG. 1B is an exploded fragmented isometric view of a bolt assembly also showing a portion of a firearm barrel of the firearm of FIG. 1A.

FIG. 1A illustrates an example firearm F, having a bolt assembly 2 and FIG. 1B is an exploded fragmented isometric view of the bolt assembly 2 aligned with a portion of a firearm barrel 20 with which it is moved into locking engagement. Referring in detail to FIG. 1B, the bolt assembly 2 generally comprises bolt 4, bolt head 5, extractor 6, barrel extension 8, cam pin 10, firing pin 12, biasing member 14, and extractor pivot pin 16. The bolt assembly 2 engages and locks into the barrel extension 8 through a series of lugs 9 arranged about the bolt head 5 of the bolt 4 and onto the rear end 18 of firearm barrel 20. The extractor pivot pin 16 may be received in a pivot bore 15 to allow pivoting of the extractor 6.

Figure 2:
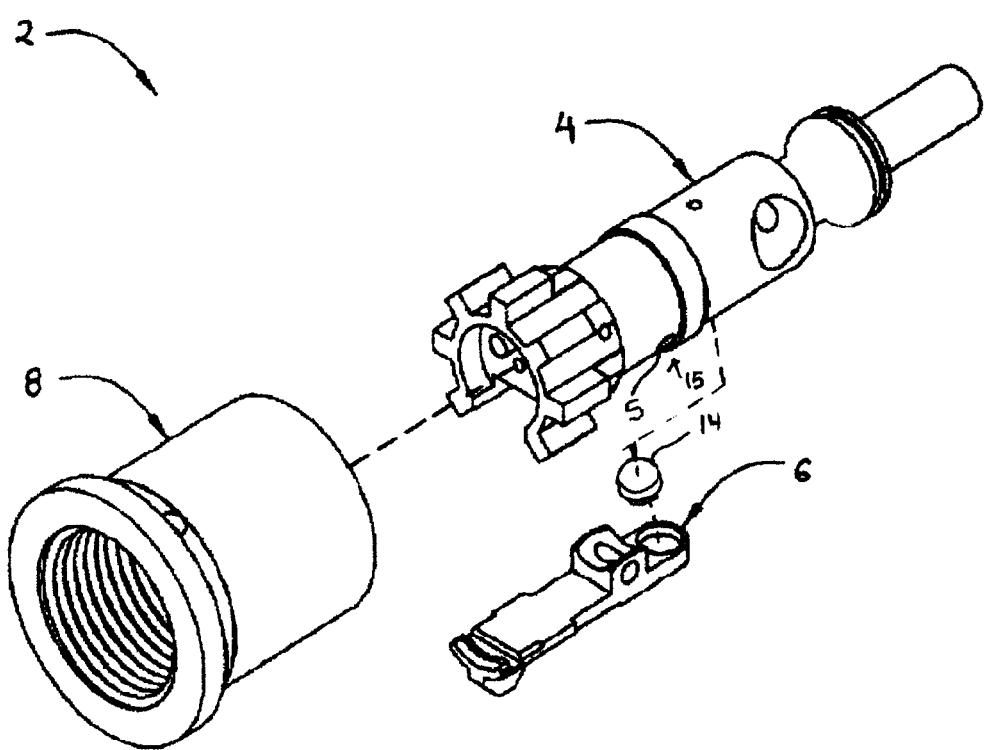
FIG. 2 further illustrates the bolt assembly of FIG. 1B.

FIG. 2 further illustrates the bolt assembly of FIG. 1B from a further perspective. As illustrated, the biasing member 14 may be engaged with the bolt 4 proximate the pivot bore 15 and may be further engaged with the extractor 6.

As indicated in FIG. 1A, the entire bolt assembly 2 may be loaded into the firearm F for operation of the firearm. The firearm will include the barrel 20 which is engaged by the bolt assembly 2. The firearm may also further include an upper receiver 28 connected to a lower receiver 29. The firearm may also further include a stock 21 and grip 22 mounted to the upper and lower receiver 28, 29. The lower receiver may include a trigger 26 arranged in a trigger guard 27 and a magazine well 23 for receiving a magazine. The firearm also may further include a hand guard 24 attached to the upper receiver 28 and surrounding at least a portion of the barrel 20. The firearm F and associated features 2, 4, 5, 6, 8, 10, 12, 14, 15, 16, 18, 20, 21, 22, 23, 24, 26, 27, 28, and 29 may be otherwise arranged, shaped, configured, and/or omitted depending upon a particular firearm implemented and without departing from the scope of this disclosure.

Figure 3:
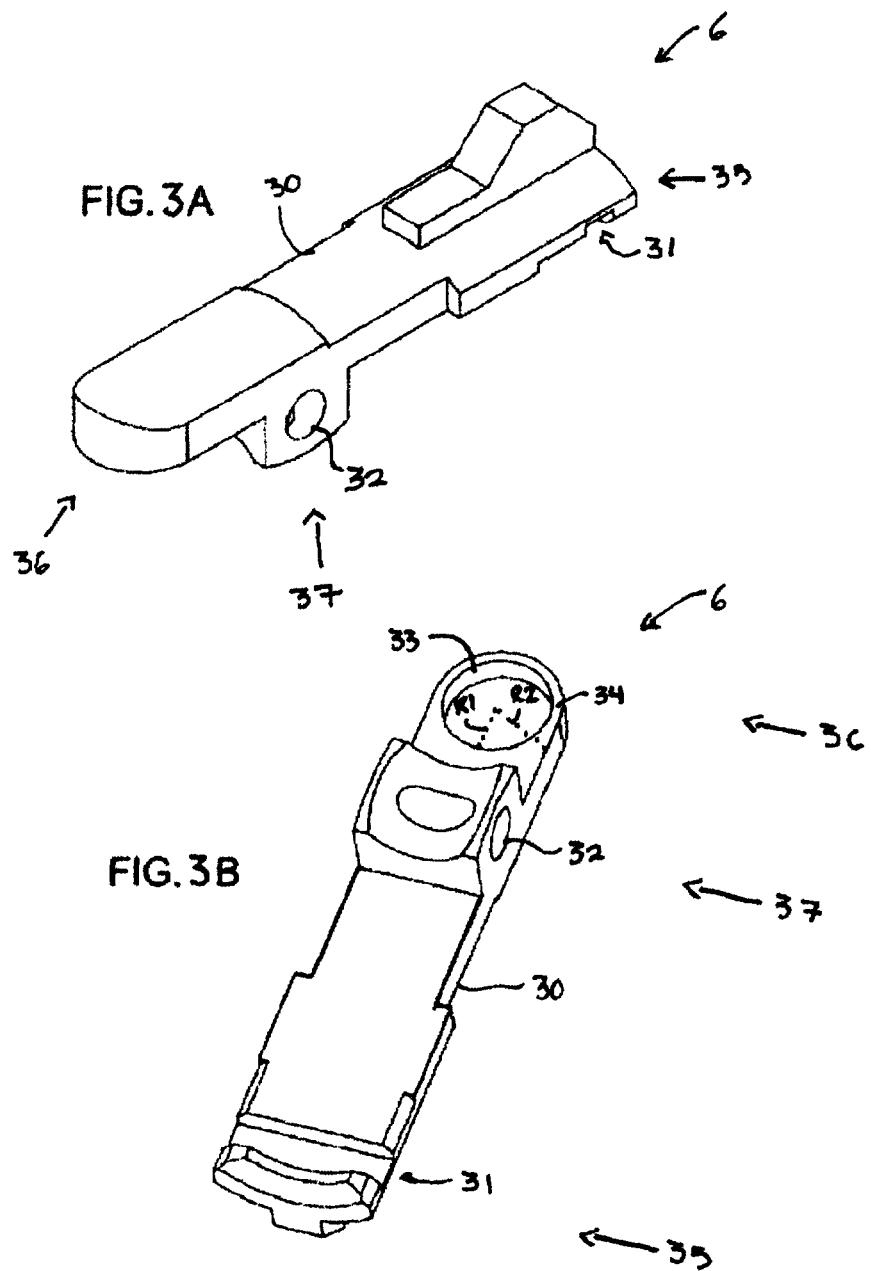
FIGS. 3A-3B illustrate details of the bolt extractor of FIGS. 1-2.

FIGS. 3A-3B illustrate further details of the extractor 6 of FIGS. 1-2. As shown, the extractor 6 includes an elongated extractor arm or body 30 having a first distal end 35, a second distal end 36, and a pivot region 37 arranged therebetween. The extractor arm 30 includes a claw or cartridge indentation portion 31 for cartridge extraction adjacent the first distal end 35. The extractor arm 30 further includes a biasing member receiving indentation or seat/recess 33 adjacent the second distal end 36 configured to receive a portion of the biasing member 14. The extractor arm 30 further includes an annular flange region 34 about the biasing member receiving indentation 33, configured to support a portion of the biasing member 14. A pivot recess or through-hole 32 also is formed in the extractor arm adjacent the pivot region 37. In general, the biasing member receiving indentation 33 may be an indented formation extending from the annular flange region 34 into an interior of the elongated body 30 at the second distal end 36. The biasing member receiving indentation 33 may have a radial dimension R1 and the annular flange region 34 may have a radial dimension R2. Furthermore, the pivot recess 32 may be a through hole configured to receive the extractor pivot pin 16. The elongated extractor body 30 and associated features 31, 32, 33, 34, 35, 36, and 37 may be otherwise shaped or configured without departing from the scope of this disclosure.

As described above, the biasing member receiving indentation 33 and the annular flange 34 may be configured to receive and support the biasing member 14, respectively. Hereinafter, the biasing member 14 is described in detail with reference to FIGS. 4-7.

Figure 4:
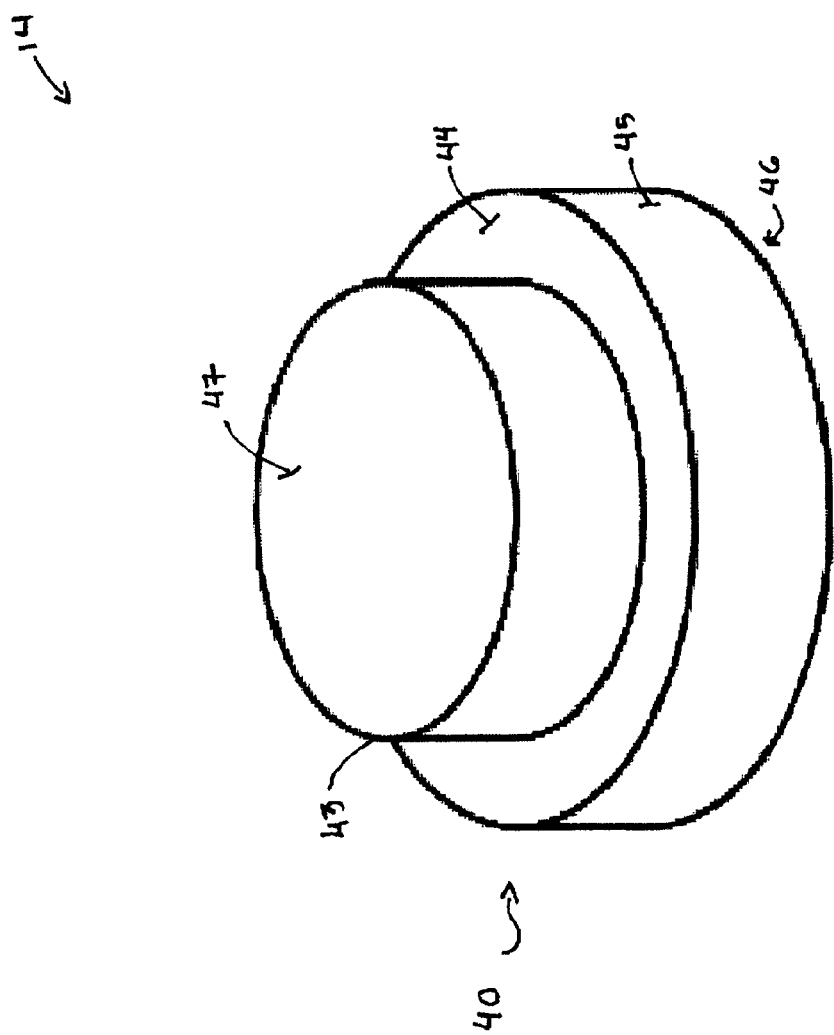
FIG. 4 is an isometric view of a biasing member useable with the bolt assembly of FIGS. 1-2 and the bolt extractor of FIGS. 3A-3B, according to an embodiment of the invention.

FIG. 4 is an isometric view of the biasing member 14 useable with the bolt assembly of FIGS. 1-2 and the bolt extractor of FIGS. 3A-3B, according to an embodiment of the invention. The biasing member 14 comprises a body generally indicated at 40.

According to one embodiment of the invention, the body 40 of the biasing member consists essentially of an elastomeric material. The elastomeric material may comprise any suitable material. For example, according to one embodiment, the elastomeric material may be comprised of elastomeric polymer units containing silicone, fluorosilicone, or fluorocarbon, not to exclude thermoplastic or thermoset elastomers known in the art including any saturated and/or unsaturated rubbers that can be formed into a part of a defined geometry upon curing. If the polymer is amorphous and has a glass-transition temperature below use temperature, then the polymer is considered an elastomer for this purpose.

According to one embodiment, an elastomeric polymer unit as described above can be as shown by Formula I, produced below:

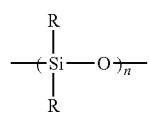

Formula I

In accordance with Formula I, R can be CH3 (giving a silicone) or R can be F, CF$_3$, and/or CH$_2$CF$_2$CF$_3$ (giving a fluorosilicone).

According to another embodiment, an elastomeric polymer unit as described above can be shown by Formula II, produced below:

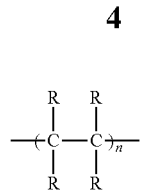

Formula II

In accordance with Formula II, R can be F and/or CF$_3$ (giving a fluorocarbon).

Figure 5:
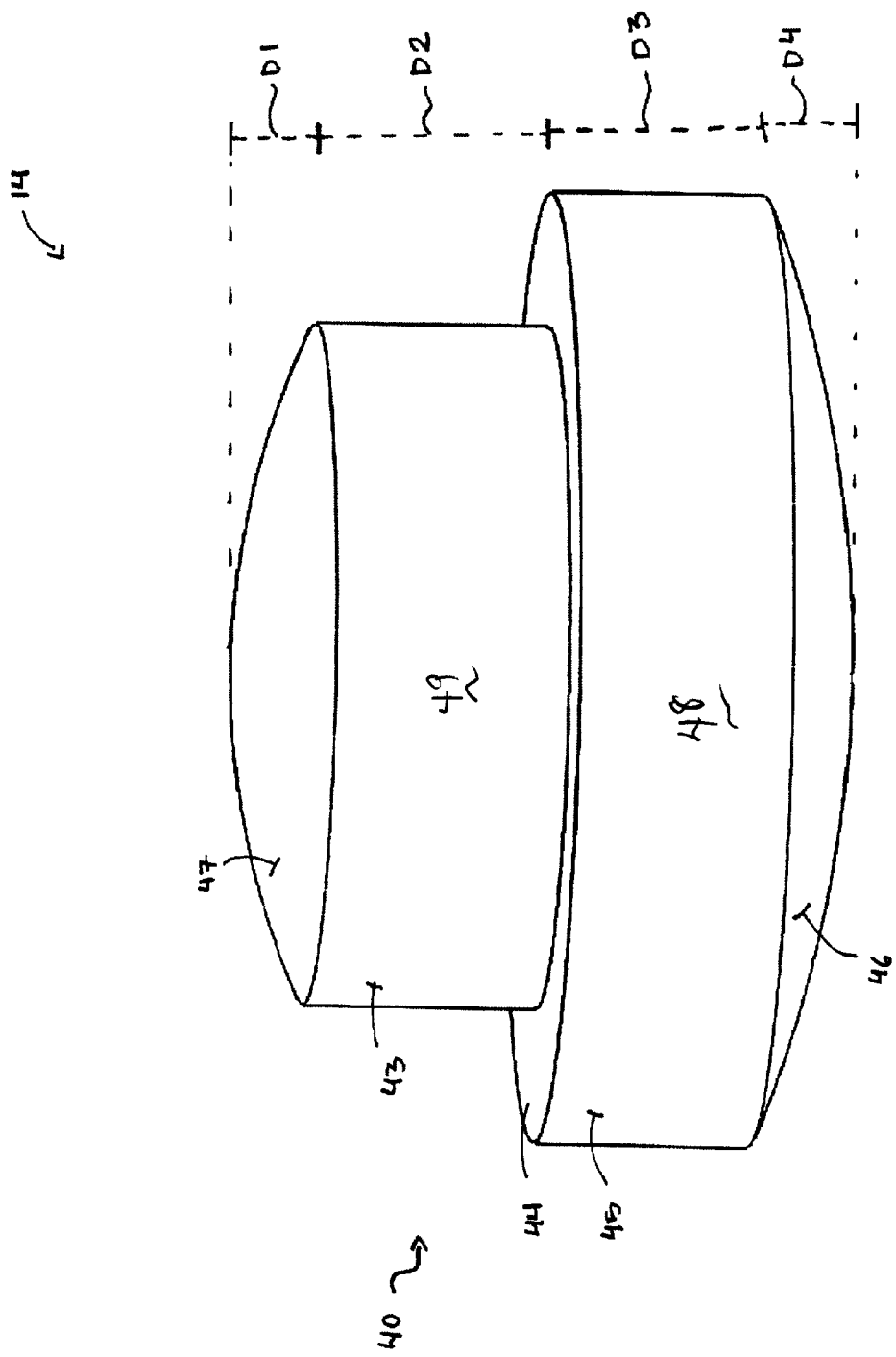
FIG. 5 is an elevation view of the biasing member of FIG. 4.
Figure 6:
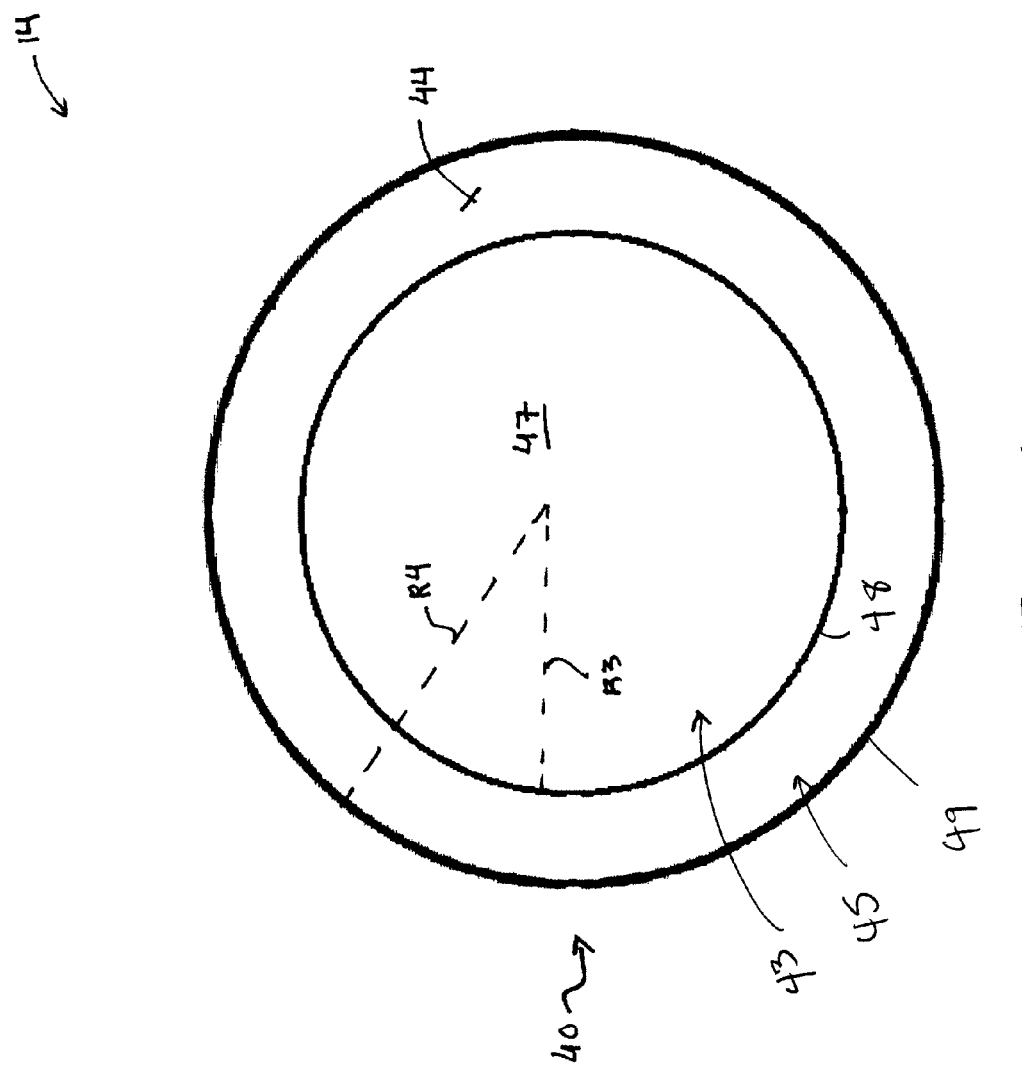
FIG. 6 is a top view of the biasing member of FIG. 4.

With reference to FIGS. 3B and 4-6, the body 40 of the biasing member 14 is shown in further detail. In general, a geometry of the annular flange region 44 and the interface of annular surface 34 provides control of extractor tension through a range of motion of the arm 30 of the extractor 6. As indicated in FIGS. 4-7 the biasing member body 40 includes a first cylindrical portion 43 configured to seat within and be engaged with the biasing member receiving indentation 33 of the extractor 6. An annular flange region 44 extends radially from the first cylindrical portion 43 and will be configured to be supported by the annular flange region 34 of the extractor 6. The body 40 further includes a second cylindrical portion 45 adjacent the annular flange region 44 and extending longitudinally therefrom such that it is external to the extractor body 30. The body 40 further includes a convex distal end 46 adjacent the second cylindrical portion 45, and a convex distal end 47 adjacent the first cylindrical portion 43. The first and second cylindrical portions 43 and 45 further will include peripheral side walls 48 and 49, respectively, as shown in FIGS. 5-6.

Generally, the interaction of the features of the body during a compression cycle, including the convex distal ends 46, 47, the annular flange region 44, and the first and second cylindrical portions 43, 45 are such that the first and second portions 43, 45 and the body 40 of the biasing member in general provide varying levels of compression sufficient to maintain a desired extractor tension with a cartridge as the extractor is pivoted during an extraction cycle. For example, the elastomeric material comprising the body 40 of the biasing member and the defined geometry of the body 40 of the biasing member provide for relatively a different level of compression, and thus the biasing force created thereby when the extractor arm 30 is initially pivoted outwards relative to the bolt head 5 versus the level/amount of compression as the extractor arm is pivoted further against the body. Furthermore, as the body 40 is comprised of elastomeric material, it generally lacks a minimum or "bottom-out" dimension as with a conventional spring, and therefore provides a constantly biasing force (which may vary depending upon overall compression of the body 40) throughout the pivoting motion of the arm 30 of the extractor 6. The body 40 of the biasing member and the associated features 43, 44, 45, 46, and 47 thereof may be otherwise shaped, arranged, and/or omitted without departing from the scope of this disclosure.

As illustrated in FIG. 5, the convex distal end 47 has an overall longitudinal dimension D1 and the first cylindrical portion 43 has an overall longitudinal dimension D2. According to one embodiment of the invention, the sum of the dimensions D1 and D2 is approximately equal to a total depth of the biasing member receiving indentation 33 of the extractor arm 30. According to another embodiment, the sum of the dimensions D1 and D2 is slightly larger than the total depth of the biasing member receiving indentation 33 of the extractor arm 30. As further illustrated in FIG. 5, the second cylindrical portion 45 has an overall longitudinal dimension D3 and the convex distal end 46 has an overall longitudinal dimension D4. According to one embodiment, the sum of the dimensions D3 and D4 is such that an appropriate biasing force is provided by the body 40 of the biasing member against the extractor arm 30 when assembled into an at least partially functional bolt assembly. The longitudinal dimensions of the body 40 of the biasing member as indicated at D1, D2, D3, and D4 in FIG. 5, may be otherwise increased, decreased, maximized, and/or minimized without departing from the scope of this disclosure.

As illustrated in FIG. 6, the first cylindrical portion 43 has a radial dimension of R3 which is approximately equal to the radial dimension R1 of the biasing member receiving indentation 33 of the extractor arm 30, according to one embodiment. Furthermore, the annular flange 44 has a radial dimension of R4 which is approximately equal to the radial dimension R2 of the annular flange region 34 of the extractor arm 30, according to another embodiment. According to one embodiment, radial dimension R4 (corresponding to a radial dimension of the second cylindrical body 45) is larger than the radial dimension R3. The radial dimensions of the body 40 of the biasing member including radii R3 and R4 shown in FIG. 6 may be otherwise increased or decreased, without departing from the scope of this disclosure.

As described above, the biasing member 14 may be assembled into a carrier 3 of the bolt assembly 2 of a firearm. Furthermore, the biasing member may be a suitable replacement for conventional coiled-spring configurations of known biasing members. For example, FIG. 7 is a cut-away view of an assembled bolt carrier assembly 3 illustrating positioning of the biasing member 14. As illustrated, the biasing member 14 is in mechanical communication with the bolt 4 and the pivoting arm 30 of the extractor 6. The body of the biasing member is received and mounted within a recess or receiving area 51 along the bolt 4, with the peripheral side wall 49 of the second cylindrical portion 45 of the body 40 of the biasing member contacting and/or being bordered by the sides 52A/52B of the receiving area/recess 51. Furthermore, the biasing member 14 provides a biasing force to the pivoting arm 30 of the extractor 6 to maintain a substantially constant extractor tension between the cartridge indentation portion or claw 31 and a cartridge during rest and when pivoting such as during loading and/or extraction cycles.

For example, as the extractor arm pivots in a direction A1, such as during a loading cycle, the biasing member 14 is compressed in the direction A2. Generally, the biasing member 14 resists this compression and provides a biasing force against the extractor arm responsive thereto. As the extractor arm further pivots in the direction A1 and the biasing member 14 is compressed in the direction A2, the biasing member 14 also can be extended in a lateral direction indicated by arrows A3. Generally, the engagement of side wall 49 of the second cylindrical portion 45 of the body with the walls 52A/52B of the receiving area/recess 51 of the bolt 4 resists this lateral deformation and provides a counter biasing force responsive thereto. Thus, as shown, due to the second portion 45 of the body 40 being constrained by the receiving area/region 51 and its further extending into the region 34 of the extractor arm 30 by way of the annular flange region 44 during an extraction operation, the biasing member 14 remains in positive communication with the extractor arm throughout its pivoting motion without "bottoming out." As a result, a consistent biasing force is provided against the extractor arm, in turn creating a substantially constant extractor tension enabling the extractor arm to maintain positive contact between the cartridge indentation portion or claw 31 and the cartridge in the firearm. It should be readily understood that although illustrated here as being a general firearm, the biasing member 14 may be dimensioned and arranged for use in biasing any suitable pivoting extractor of any suitable firearm, including long guns, rifles, handguns, shotguns, or any other firearm having a pivoting extractor.

The foregoing description generally illustrates and describes various embodiments of the present invention. The examples given above are merely illustrative and are not meant to be an exhaustive list of all possible designs, aspects, applications or modifications of the present disclosure. It will, therefore, be understood by those skilled in the art that while the present disclosure has been described in terms of exemplary aspects, the present disclosure can be practiced with various changes and modifications which can be made to the above-discussed construction of the present invention without departing from the spirit and scope of the invention as disclosed herein, and that it is intended that all matter contained in the above description or shown in the accompanying drawings shall not to be taken in a limiting sense.

Furthermore, the scope of the present disclosure shall be construed to cover various modifications, combinations, additions, alterations, etc., to the above-described embodiments, which shall be considered to be within the scope of the present invention. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention.

What is claimed is:

1. A bolt assembly for a firearm, comprising:
   a bolt;
   an extractor arm pivotally mounted in the bolt having a biasing member receiving indentation formed thereon; and
   a biasing member in mechanical communication with the extractor arm and the bolt so as to provide a biasing force against the extractor arm, the biasing member comprising a compressible body having a first cylindrical portion engaged with the biasing member receiving indentation of the extractor arm and having a first diameter and a second cylindrical portion received along the bolt and having a second diameter greater than the first diameter, wherein the body consists essentially of an elastomeric material and is configured to maintain a substantially constant extractor tension between the extractor arm and a cartridge engaged by the bolt assembly.

2. The bolt assembly of claim 1, wherein the extractor arm comprises a first end, a second end opposite the first end, and a pivoting region arranged between the first end and the second end, wherein the extractor arm is configured to pivot on the pivoting region against the bolt.

3. The bolt assembly of claim 2, wherein the extractor arm comprises a claw shaped portion proximate its first end.

4. The bolt assembly of claim 3, wherein the biasing member receiving indentation is proximate the second end.

5. The bolt assembly of claim 1, wherein the elastomeric material comprises elastomeric polymer units containing silicone, fluorosilicone, or fluorocarbon.

6. The bolt assembly of claim 1, wherein the elastomeric material comprises elastomeric polymer units having the formula:

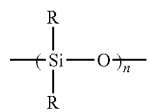

wherein R is selected from the group consisting of $CH_3$, F, $CF_3$, and $CH_2CF_2CF_3$.

7. The bolt assembly of claim 1, wherein the elastomeric material comprises elastomeric polymer units having the formula:

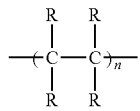

wherein R is selected from the group consisting of F and $CF_3$.

8. The bolt assembly of claim 1, wherein the elastomeric material comprises elastomeric polymer units containing thermoplastic or thermoset elastomers.

9. The bolt assembly of claim 1, wherein the body of the biasing member further comprises a first convex distal end adjacent the first cylindrical portion configured to engage the biasing member receiving indentation and a second convex distal end adjacent the second cylindrical portion configured to engage the bolt.

10. The bolt assembly of claim 1, further comprising an annular flange between the first and second cylindrical portions configured to be supported by an annular surface about the biasing member receiving indentation.

* * * * *

UNITED STATES PATENT AND TRADEMARK OFFICE
CERTIFICATE OF CORRECTION

PATENT NO. : 8,887,426 B2
APPLICATION NO. : 13/837298
DATED : November 18, 2014
INVENTOR(S) : Devin Feese and Jeffrey W. Stone It is certified that error appears in the above-identified patent and that said Letters Patent is hereby corrected as shown below:

On the Title Page item (73), should read: "Assignee: RA Brands, L.L.C., Madison, NC (US)"

Signed and Sealed this
Eighth Day of September, 2015

Michelle K. Lee
*Director of the United States Patent and Trademark Office*